(12) United States Patent
Liu et al.

(10) Patent No.: US 9,087,345 B2
(45) Date of Patent: *Jul. 21, 2015

(54) SYSTEM AND METHOD FOR OPERATING A MOBILE DEVICE

(71) Applicant: ConvenientPower HK Ltd., Central, Hong Kong (CN)

(72) Inventors: Xun Liu, Hong Kong (CN); Emmanuel Girma, Hong Kong (CN)

(73) Assignee: ConvenientPower HK Ltd., Central (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,375

(22) Filed: Jul. 18, 2014

(65) Prior Publication Data

US 2014/0344059 A1    Nov. 20, 2014

Related U.S. Application Data

(63) Continuation of application No. 13/190,280, filed on Jul. 25, 2011, now Pat. No. 8,823,318.

(51) Int. Cl.

| H02J 7/00 | (2006.01) |
|---|---|
| H01F 27/42 | (2006.01) |
| H04B 5/00 | (2006.01) |
| G06Q 30/02 | (2012.01) |
| H02J 7/02 | (2006.01) |
| H02J 5/00 | (2006.01) |
| G06Q 20/32 | (2012.01) |
| H04W 4/02 | (2009.01) |

(52) U.S. Cl.
CPC .......... *G06Q 30/0261* (2013.01); *G06Q 20/322* (2013.01); *G06Q 30/02* (2013.01); *G06Q 30/0267* (2013.01); *H02J 5/005* (2013.01); *H02J 7/025* (2013.01); *H04B 5/0037* (2013.01); *H04W 4/02* (2013.01); *H04W 4/021* (2013.01)

(58) Field of Classification Search
CPC .......... H02J 5/005; H02J 7/025; G06Q 30/02; G06Q 20/32; H04B 5/0037; H04W 4/02; H04W 4/021
USPC .......................... 320/108; 307/104; 455/41.2
See application file for complete search history.

(56) References Cited

U.S. PATENT DOCUMENTS

| 7,986,059 | B2 * | 7/2011 | Randall | 307/104 |
|---|---|---|---|---|
| 8,180,286 | B2 * | 5/2012 | Yamasuge | 455/41.1 |
| 8,629,651 | B2 * | 1/2014 | Guccione et al. | 320/108 |
| 2004/0220772 | A1 * | 11/2004 | Cobble et al. | 702/183 |

(Continued)

*Primary Examiner* — M'Baye Diao
(74) *Attorney, Agent, or Firm* — Fenwick & West LLP

(57) ABSTRACT

The present invention provides a mobile device including: a power receiver for wirelessly coupling with a power transmitter to receive power wirelessly from the power transmitter; and a function that automatically initiates upon the power receiver wirelessly coupling with the power transmitter. Also provided is a transmitter apparatus including a power transmitter for wirelessly coupling with a power receiver in a mobile device to provide power wirelessly to the power receiver, wherein, upon the power receiver wirelessly coupling with the power transmitter, data is transferred between the power transmitter and the power receiver and a function of the mobile device automatically initiates. The mobile device and transmitter apparatus together form a system for operating the mobile device. Methods and computer-readable media storing executable application programs associated with the system are also provided.

22 Claims, 9 Drawing Sheets

(56) References Cited

U.S. PATENT DOCUMENTS

| | | | |
|---|---|---|---|
| 2008/0228600 A1* | 9/2008 | Treyz et al. | 705/27 |
| 2009/0212636 A1* | 8/2009 | Cook et al. | 307/104 |
| 2009/0243397 A1* | 10/2009 | Cook et al. | 307/104 |
| 2010/0194206 A1* | 8/2010 | Burdo et al. | 307/104 |
| 2011/0050164 A1* | 3/2011 | Partovi et al. | 320/108 |
| 2011/0161001 A1* | 6/2011 | Fink | 701/201 |
| 2011/0230150 A1* | 9/2011 | Rofougaran | 455/127.1 |
| 2011/0260681 A1* | 10/2011 | Guccione et al. | 320/108 |

\* cited by examiner

US 9,087,345 B2

SYSTEM AND METHOD FOR OPERATING A MOBILE DEVICE

CROSS REFERENCE TO RELATED APPLICATIONS

This application is a continuation of U.S. application Ser. No. 13/190,280, filed Jul. 25, 2011, which is incorporated by reference herein in its entirety.

FIELD OF THE INVENTION

The present invention relates to systems and methods for operating functions or applications on a mobile device, and in particular, in the context of power charging systems and methods.

BACKGROUND OF THE INVENTION

Wireless charging is gaining significant market traction, especially when applied with mobile phones. This is being driven by the following main factors:

(i) there is an increasing power gap between the power needs of mobiles and the power supply batteries; wireless charging offers the most convenient way to constantly keep the batteries charged; and (ii) wireless charging standardization efforts, such as the efforts of the Wireless Power Consortium (WPC), are driving the wide adoption of wireless charging and the scale of the wireless charging market.

Due to the ultimate convenience wireless charging brings, users will be more inclined to constantly put their chargeable mobile devices on wireless charging transmitters. It is therefore desirable to include more features to further enhance this convenience.

It is an object of the present invention to overcome or ameliorate at least one of the disadvantages of the prior art, or to provide a useful alternative.

SUMMARY OF THE INVENTION

The present invention provides, in a first aspect, a mobile device including: a power receiver for wirelessly coupling with a power transmitter to receive power wirelessly from the power transmitter; and a function that automatically initiates upon the power receiver wirelessly coupling with the power transmitter.

Preferably, the mobile device includes an initiator feature that automatically initiates the function upon the power receiver wirelessly coupling with the power transmitter. In one embodiment, the initiator feature is integral with the mobile device.

Preferably, the initiator feature includes an initiator application. In one embodiment, the initiator application automatically initiates upon the power receiver wirelessly coupling with the power transmitter. In another embodiment, the initiator application runs in the background on the mobile device. In one embodiment, the initiator application is manually downloadable onto the mobile device. In another embodiment, the initiator application is pre-loaded onto the mobile device. In a further embodiment, the initiator feature automatically downloads the initiator application onto the mobile device upon the power receiver wirelessly coupling with the power transmitter.

Preferably, at least part of the function forms part of the initiator application.

In one embodiment, the function only runs whilst the power receiver is coupled with the power transmitter.

Preferably, at least part of the function takes the form of a target application. In one embodiment, the target application is manually downloadable onto the mobile device. In another embodiment, the target application is pre-loaded onto the mobile device. In a further embodiment, the function automatically downloads the target application onto the mobile device.

In one embodiment, the function is dependent upon the location of the mobile device or the power transmitter. In another embodiment, the function is dependent upon the orientation of the mobile device.

In one embodiment, the function includes data transfer between the mobile device and another device.

In one embodiment, the power transmitter is part of a transmitter apparatus having a second power transmitter that can couple with a second power receiver in a second mobile device, and the function includes data transfer between the mobile device and the second mobile device. In one embodiment, the second power receiver couples with the second power transmitter using a wired connection. In another embodiment, the mobile device is a mobile phone and the second mobile device is a portable computer.

In one embodiment, the function includes requesting payment details from a user of the mobile device before receiving power wirelessly from the power transmitter.

In one embodiment, the function includes triggering an alarm if the mobile device is decoupled from the power transmitter before a user inputs a predetermined password.

In one embodiment, the function includes providing promotional information of a target business to a user of the mobile device. Preferably, the promotional information includes an offer from the target business redeemable by the user. Preferably, the power transmitter is associated with a source business and a reward is provided to the source business when the offer is redeemed. In one embodiment, the mobile device includes a positioning module to determine the location of the mobile device, the function providing promotional information of a product provided by the target business, wherein the product can be delivered within a predetermined proximity to the location of the mobile device.

In one embodiment, the function includes providing a sample or a preview of a product. In one embodiment, the sample or the preview is only provided whilst the power receiver is coupled with the power transmitter. Preferably, the function includes requesting payment and providing the product after accepting payment for the product. In one embodiment, the function requests payment after the power receiver decouples from the power transmitter. Preferably, the product is a book, movie, video game, or a service accessible by the mobile device.

Preferably, the mobile device includes one or more of the functions, wherein one of the functions is pre-set on the mobile device, or is set via a computer coupled with the mobile device, or is set via the mobile device, to automatically initiate upon the power receiver wirelessly coupling with the power transmitter.

Preferably, the mobile device includes one or more of the functions, wherein the power transmitter has a mode, and one of the functions corresponds to the mode and automatically initiates upon the power receiver wirelessly coupling with the power transmitter.

In one embodiment, the mode, and thereby the corresponding function, corresponds to a location of the power transmitter.

Preferably, the function that corresponds to the mode is pre-set on the mobile device, or is set via a computer coupled with the mobile device, or is set via the mobile device.

Preferably, the power transmitter has a plurality of the modes, each corresponding to any one of the functions, with one of the modes being selectable such that the function corresponding to the selected mode automatically initiates upon the power receiver wirelessly coupling with the power transmitter. In one embodiment, the selected mode is selectable via the mobile device whilst the power receiver is coupled with the power transmitter. In another embodiment, the power transmitter has one or more switches corresponding to the modes and the selected mode is selectable by operating the one or more switches. In a further embodiment, the selected mode is selectable via a computer coupled with the power transmitter.

Preferably, the power receiver receives power wirelessly from the power transmitter thereby to define a power transfer channel, and wherein data is transferable through the power transfer channel. Preferably, the power receiver receives power wirelessly from the power transmitter in the form of a power signal in the power transfer channel, and wherein data is encoded onto the power signal. Preferably, data is encoded into the power signal by modulating the power signal. Preferably, the power transmitter has one or more of a mode, an ID, and location information and the data includes one or more of the mode, the ID, and the location information.

Preferably, the power receiver couples with the power transmitter using magnetic induction. Preferably, the power receiver includes a planar receiver winding for coupling by magnetic induction with the power transmitter. Preferably, the power transmitter includes one or more planar transmitter windings each for coupling by magnetic induction with the power receiver. Preferably, the one or more transmitter windings are located in a surface of the power transmitter to define a charging surface, and wherein the mobile device can be placed onto the charging surface.

The present invention also provides, in a second aspect, a transmitter apparatus including a power transmitter for wirelessly coupling with a power receiver in a mobile device to provide power wirelessly to the power receiver, wherein, upon the power receiver wirelessly coupling with the power transmitter, data is transferred between the power transmitter and the power receiver and a function of the mobile device automatically initiates.

Preferably, the power transmitter has a mode, the mobile device including one or more of the functions, and wherein one of the functions corresponds to the mode and automatically initiates upon the power receiver wirelessly coupling with the power transmitter.

In one embodiment, the mode, and thereby the corresponding function, corresponds to a location of the power transmitter.

Preferably, the function that corresponds to the mode is pre-set on the mobile device, or is set via a computer coupled with the mobile device, or is set via the mobile device.

Preferably, the power transmitter has a plurality of the modes, each corresponding to any one of the functions, with one of the modes being selectable such that the function corresponding to the selected mode automatically initiates upon the power receiver wirelessly coupling with the power transmitter. In one embodiment, the selected mode is selectable via the mobile device whilst the power receiver is coupled with the power transmitter. In another embodiment, the power transmitter has one or more switches corresponding to the modes and the selected mode is selectable by operating the one or more switches. In a further embodiment, the selected mode is selectable via a computer coupled with the power transmitter.

Preferably, the power receiver receives power wirelessly from the power transmitter thereby to define a power transfer channel, and wherein data is transferable through the power transfer channel. Preferably, the power receiver receives power wirelessly from the power transmitter in the form of a power signal in the power transfer channel, and wherein data is encoded onto the power signal. Preferably, data is encoded into the power signal by modulating the power signal. Preferably, the power transmitter has one or more of a mode, an ID, and location information and the data includes one or more of the mode, the ID, and the location information.

Preferably, the power receiver couples with the power transmitter using magnetic induction. Preferably, the power transmitter includes one or more planar transmitter windings each for coupling by magnetic induction with the power receiver. Preferably, the power receiver includes a planar receiver winding for coupling by magnetic induction with the power transmitter. Preferably, the one or more transmitter windings are located in a surface of the transmitter apparatus to define a charging surface for receiving the mobile device.

In one embodiment, the transmitter apparatus includes a second power transmitter that can couple with a second power receiver in a second mobile device, and the function includes data transfer between the mobile device and the second mobile device. In one embodiment, the second power receiver couples with the second power transmitter using a wired connection. In one embodiment, the mobile device is a mobile phone and the second mobile device is a portable computer.

Preferably, the power transmitter transmits power wirelessly to the power receiver thereby to define a first power transfer channel, and the second power transmitter transmits power wirelessly to the second power receiver thereby to define a second power transfer channel, wherein the data transfer between the mobile device and the second mobile device includes transferring data between the mobile device and the power transmitter through the first power transfer channel, transferring data between the second mobile device and the second power transmitter through the second power transfer channel, and transferring data between the first and second power transmitters.

Preferably, the transmitter apparatus includes a plurality of the power transmitters such that the transmitter apparatus can provide power wirelessly to a plurality of the mobile devices simultaneously.

The present invention also provides, in a third aspect, a system including: a mobile device as described above; and a transmitter apparatus as described above.

The present invention also provides, in a fourth aspect, a computer-readable medium with an executable application program stored thereon, the executable application program downloadable to a mobile device having a power receiver for wirelessly coupling with a power transmitter to receive power wirelessly from the power transmitter, such that the executable application program automatically initiates a function of the mobile device upon the power receiver wirelessly coupling with the power transmitter.

In one embodiment, the executable application program automatically initiates upon the power receiver wirelessly coupling with the power transmitter. In another embodiment, the executable application program runs in the background on the mobile device.

In one embodiment, the executable application program is manually downloadable onto the mobile device. In another embodiment, the executable application program is automatically downloaded onto the mobile device by an initiator feature of the mobile device upon the power receiver wirelessly coupling with the power transmitter.

In one embodiment, at least part of the function forms part of the executable application program.

In one embodiment, the executable application program only allows the function to run whilst the power receiver is coupled with the power transmitter.

Preferably, at least part of the function takes the form of a target application. In one embodiment, the executable application program automatically downloads the target application onto the mobile device.

The present invention also provides, in a fifth aspect, a computer-readable medium with an executable application program stored thereon, the executable application program downloadable to a mobile device having a power receiver for wirelessly coupling with a power transmitter to receive power wirelessly from the power transmitter, such that the executable application program forms at least part of a function that is automatically initiated upon the power receiver wirelessly coupling with the power transmitter.

In one embodiment, the executable application program only runs whilst the power receiver is coupled with the power transmitter.

In one embodiment, the executable application program is manually downloadable onto the mobile device. In another embodiment, the function automatically downloads the executable application program onto the mobile device.

In one embodiment, the executable application program is dependent upon the location of the mobile device or the power transmitter. In another embodiment, the executable application program is dependent upon the orientation of the mobile device.

In one embodiment, the executable application program transfers data between the mobile device and another device.

In one embodiment, the power transmitter is part of a transmitter apparatus having a second power transmitter that can couple with a second power receiver in a second mobile device, and the executable application program transfers data between the mobile device and the second mobile device. In one embodiment, the second power receiver couples with the second power transmitter using a wired connection. In one embodiment, the mobile device is a mobile phone and the second mobile device is a portable computer.

In one embodiment, the executable application program requests payment details from a user of the mobile device before receiving power wirelessly from the power transmitter.

In one embodiment, the executable application program triggers an alarm if the mobile device is decoupled from the power transmitter before a user inputs a predetermined password.

In one embodiment, the executable application program provides promotional information of a target business to a user of the mobile device. Preferably, the promotional information includes an offer from the target business redeemable by the user. Preferably, the power transmitter is associated with a source business and a reward is provided to the source business when the offer is redeemed. In one embodiment, the mobile device includes a positioning module to determine the location of the mobile device, the executable application program providing promotional information of a product provided by the target business, wherein the product can be delivered within a predetermined proximity to the location of the mobile device.

In one embodiment, the executable application program provides a sample or a preview of a product. In one embodiment, the sample or the preview is only provided whilst the power receiver is coupled with the power transmitter. Preferably, the executable application program requests payment and provides the product after accepting payment for the product. In one embodiment, the executable application program requests payment after the power receiver decouples from the power transmitter. Preferably, the product is a book, movie, video game, or a service accessible by the mobile device.

In a sixth aspect, the present invention provides a method of manufacturing or supplying a mobile device having a power receiver for wirelessly coupling with a power transmitter to receive power wirelessly from the power transmitter, the method including adding into the mobile device a function that automatically initiates upon the power receiver, wirelessly coupling with the power transmitter.

Preferably, the method includes adding into the mobile device an initiator feature that automatically initiates the function upon the power receiver wirelessly coupling with the power transmitter. In one embodiment, the initiator feature is added such that it is integral with the mobile device.

Preferably, the initiator feature includes an initiator application. In one embodiment, the initiator application automatically initiates upon the power receiver wirelessly coupling with the power transmitter. In another embodiment, the initiator application runs in the background on the mobile device. In one embodiment, the method includes providing the initiator application for downloading onto the mobile device manually. In another embodiment, the method includes pre-loading the initiator application onto the mobile device. In a further embodiment, the initiator feature automatically downloads the initiator application onto the mobile device upon the power receiver wirelessly coupling with the power transmitter.

Preferably, at least part of the function forms part of the initiator application.

In one embodiment, the function only runs whilst the power receiver is coupled with the power transmitter.

Preferably, at least part of the function takes the form of a target application. In one embodiment, the method includes providing the target application for downloading onto the mobile device manually. In another embodiment, the method includes pre-loading the target application onto the mobile device. In a further embodiment, the function automatically downloads the target application onto the mobile device.

Preferably, the method includes incorporating into the mobile device one or more of the functions, wherein one of the functions is set to automatically initiate upon the power receiver wirelessly coupling with the power transmitter. In one embodiment, the method includes pre-setting said one of the functions. In another embodiment, the method includes setting said one of the functions via a computer coupled with the mobile device. In a further embodiment, said one of the functions is set via the mobile device.

Preferably, the method includes incorporating into the mobile device one or more of the functions, wherein the power transmitter has a mode, and one of the functions corresponds to the mode and automatically initiates upon the power receiver wirelessly coupling with the power transmitter.

In one embodiment, the mode, and thereby the corresponding function, corresponds to a location of the power transmitter.

In one embodiment, the method includes pre-setting said one of the functions to correspond to the mode. In another embodiment, the method includes setting said one of the functions to correspond to the mode via a computer coupled with the mobile device. In a further embodiment, said one of the functions is set to correspond to the mode via the mobile device.

Preferably, the power transmitter has a plurality of the modes, each corresponding to any one of the functions, with one of the modes being selectable such that the function corresponding to the selected mode automatically initiates upon the power receiver wirelessly coupling with the power transmitter. In one embodiment, the selected mode is selectable via the mobile device whilst the power receiver is coupled with the power transmitter. In another embodiment, the power transmitter has one or more switches corresponding to the modes and the selected mode is selectable by operating the one or more switches. In a further embodiment, the selected mode is selectable via a computer coupled with the power transmitter.

Preferably, the power receiver receives power wirelessly from the power transmitter thereby to define a power transfer channel, and wherein data is transferable through the power transfer channel. Preferably, the power receiver receives power wirelessly from the power transmitter in the form of a power signal in the power transfer channel, and wherein data is encoded onto the power signal. Preferably, data is encoded into the power signal by modulating the power signal. Preferably, the power transmitter has one or more of a mode, an ID, and location information and the data includes one or more of the mode, the ID, and the location information.

Preferably, the power receiver couples with the power transmitter using magnetic induction. Preferably, the power receiver includes a planar receiver winding for coupling by magnetic induction with the power transmitter. Preferably, the power transmitter includes one or more planar transmitter windings each for coupling by magnetic induction with the power receiver. Preferably, the one or more transmitter windings are located in a surface of the power transmitter to define a charging surface, and wherein the mobile device can be placed onto the charging surface.

In a seventh aspect, the present invention provides a method of manufacturing or supplying a transmitter apparatus having a power transmitter for wirelessly coupling with a power receiver in a mobile device to provide power wirelessly to the power receiver, the method including configuring the transmitter apparatus such that upon the power receiver wirelessly coupling with the power transmitter, data is transferred between the power transmitter and the power receiver and a function of the mobile device automatically initiates.

Preferably, the method includes configuring the power transmitter with a mode, the mobile device including one or more of the functions, and wherein one of the functions corresponds to the mode and automatically initiates upon the power receiver wirelessly coupling with the power transmitter.

In one embodiment, the mode, and thereby the corresponding function, corresponds to a location of the power transmitter.

Preferably, the function that corresponds to the mode is pre-set on the mobile device, or is set via a computer coupled with the mobile device, or is set via the mobile device.

Preferably, the method includes configuring the power transmitter with a plurality of the modes, each corresponding to any one of the functions, with one of the modes being selectable such that the function corresponding to the selected mode automatically initiates upon the power receiver wirelessly coupling with the power transmitter. In one embodiment, the method includes selecting said one of the modes via the mobile device whilst the power receiver is coupled with the power transmitter. In another embodiment, the power transmitter has one of more switches corresponding to the modes and the method includes selecting said one of the modes by operating the one or more switches. In a further embodiment, the method includes selecting said one of the modes via a computer coupled with the power transmitter.

Preferably, the power receiver receives power wirelessly from the power transmitter thereby to define a power transfer channel, and wherein data is transferable through the power transfer channel. Preferably, the power receiver receives power wirelessly from the power transmitter in the form of a power signal in the power transfer channel, and wherein data is encoded onto the power signal. Preferably, data is encoded into the power signal by modulating the power signal. Preferably, the power transmitter has one or more of a mode, an ID, and location information and the data includes one or more of the mode, the ID, and the location information.

Preferably, the power receiver couples with the power transmitter using magnetic induction. Preferably, the power transmitter includes one or more planar transmitter windings each for coupling by magnetic induction with the power receiver. Preferably, the power receiver includes a planar receiver winding for coupling by magnetic induction with the power transmitter. Preferably, the one or more transmitter windings are located in a surface of the transmitter apparatus to define a charging surface for receiving the mobile device.

In one embodiment, the transmitter apparatus includes a second power transmitter that can couple with a second power receiver in a second mobile device, and the function includes data transfer between the mobile device and the second mobile device. In one embodiment, the second power receiver couples with the second power transmitter using a wired connection. In one embodiment, the mobile device is a mobile phone and the second mobile device is a portable computer.

Preferably, the power transmitter transmits power wirelessly to the power receiver thereby to define a first power transfer channel, and the second power transmitter transmits power wirelessly to the second power receiver thereby to define a second power transfer channel, wherein the data transfer between the mobile device and the second mobile device includes transferring data between the mobile device and the power transmitter through the first power transfer channel, transferring data between the second mobile device and the second power transmitter through the second power transfer channel, and transferring data between the first and second power transmitters.

Preferably, the transmitter apparatus includes a plurality of the power transmitters such that the transmitter apparatus can provide power wirelessly to a plurality of the mobile devices simultaneously.

BRIEF DESCRIPTION OF THE FIGURES

Preferred embodiments in accordance with the best mode of the present invention will now be described, by way of example only, with reference to the accompanying figures, in which.

DETAILED DESCRIPTION OF THE BEST MODE OF THE INVENTION

Figure 1:
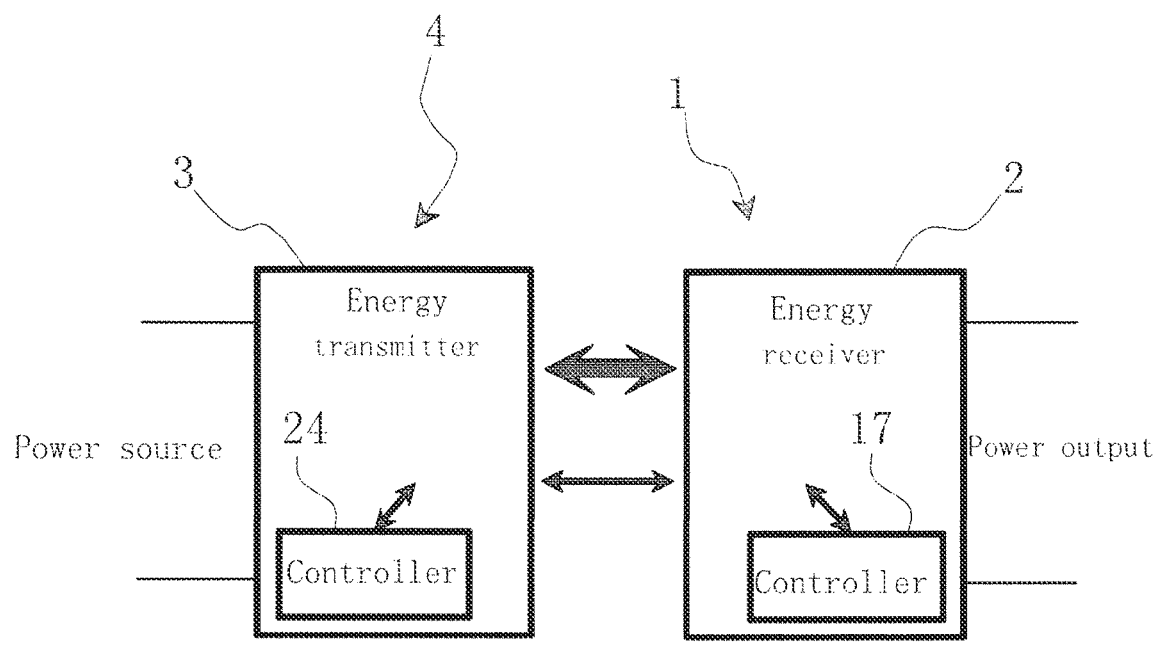
FIG. 1 is a schematic diagram of a power transmitter of a transmitter apparatus and a power receiver of a mobile device in accordance with embodiments of the present invention.

Referring to the figures, a preferred embodiment of the present invention provides a mobile device 1 including a power receiver 2 for wirelessly coupling with a power transmitter 3 to receive power wirelessly from the power transmitter. In particular, the mobile device 1 has a function that automatically initiates upon the power receiver 2 wirelessly coupling with the power transmitter 3.

Another preferred embodiment of the present invention provides a transmitter apparatus 4 that includes the power transmitter 3 for wirelessly coupling with the power receiver 2 in the mobile device 1 to provide power wirelessly to the power receiver 2. Upon the power receiver 2 wirelessly coupling with the power transmitter 3, data is transferred between the power transmitter and the power receiver and a function of the mobile device 1 automatically initiates.

It will be appreciated, however, that it is not necessary for the power receiver 2 of the mobile device 1 to couple with a transmitter apparatus that has a power transmitter that can transfer data with the power receiver 2, such as the power transmitter 3 of the transmitter apparatus 4 described above. Advantageously, the power receiver 2 of the mobile device 1 can wirelessly couple with a wide range of power transmitters to receive power wirelessly.

It will also be appreciated that another preferred embodiment of the present invention provides a system including a mobile device having a power receiver for wirelessly coupling with a power transmitter to receive power wirelessly from the power transmitter, and a transmitter apparatus that includes the power transmitter for wirelessly coupling with the power receiver in the mobile device to provide power wirelessly to the power receiver. Upon the power receiver wirelessly coupling with the power transmitter, a function of the mobile device automatically initiates. In one embodiment of this system, the mobile device is the mobile device 1 described above. In another embodiment this system, the mobile device is the mobile device 1 described above, and the transmitter apparatus is the transmitter apparatus 4 described above.

Thus, the present invention discloses a feature in which once a user puts a mobile device, including a power receiver, on or close to a power transmitter, not only does the wireless power charging process begin, but also other applications of the mobile device initiate automatically.

Turning back now to the mobile device 1 described above, the mobile device includes an initiator feature 5 that automatically initiates the function upon the power receiver 2 wirelessly coupling with the power transmitter 3. The initiator feature 5 can be a hardware component, a software component, or a combination of hardware and software components. In one embodiment, the initiator feature 5 is a hardware accessory that couples with the mobile device 1. Embodiments include a sleeve that houses the mobile device 1, or separate device that connects with the mobile device 1 via a connection port on the mobile device.

In some embodiments, the initiator feature 5 is integral with the mobile device 1. The initiator feature can be provided integrally with the mobile device at manufacture. In particular, whether the initiator feature includes hardware or software components or both, some or all of these can be integrated with the mobile device 1 at manufacture.

In some embodiments, the initiator feature 5 includes an initiator application 6. With some of these embodiments, the initiator feature 5 takes the form of an initiator application 6, that is, the initiator feature is an initiator application. The initiator application 6 can automatically initiate upon the power receiver wirelessly coupling with the power transmitter, or the initiator application 6 can run in the background on the mobile device 1.

In one embodiment, the initiator application 6 is manually downloadable onto the mobile device 1. This can be done by, for example, a user of the mobile device 1, or a reseller, distributor, manufacturer or supplier of the mobile device before it is provided to an end user. In another embodiment, the initiator application 6 is pre-loaded onto the mobile device. This can be done by, for example, a manufacturer, supplier, reseller or distributor of the mobile device 1 before it is provided to an end user. In another embodiment, the initiator feature 5 automatically downloads the initiator application 6 onto the mobile device 1 upon the power receiver 2 wirelessly coupling with the power transmitter 3.

In one embodiment, at least part of the function that initiates automatically forms part of the initiator application 6. In some embodiments, the function only runs whilst the power receiver is coupled with the power transmitter. In some embodiments, at least part of the function takes the form of a target application 7. In some embodiments, the whole function takes the form of a target application. This target application 7 can involve hardware or software components or a mixture of both.

In one embodiment, the target application 7 is manually downloadable onto the mobile device 1. This can be done by, for example, a user of the mobile device 1, or a reseller, distributor, manufacturer or supplier of the mobile device before it is provided to an end user. In another embodiment, the target application 7 is pre-loaded onto the mobile device 1. This can be done by, for example, a manufacturer, supplier, reseller or distributor of the mobile device 1 before it is provided to an end user. In another embodiment, the function automatically downloads the target application 7 onto the mobile device 1.

Figure 5:
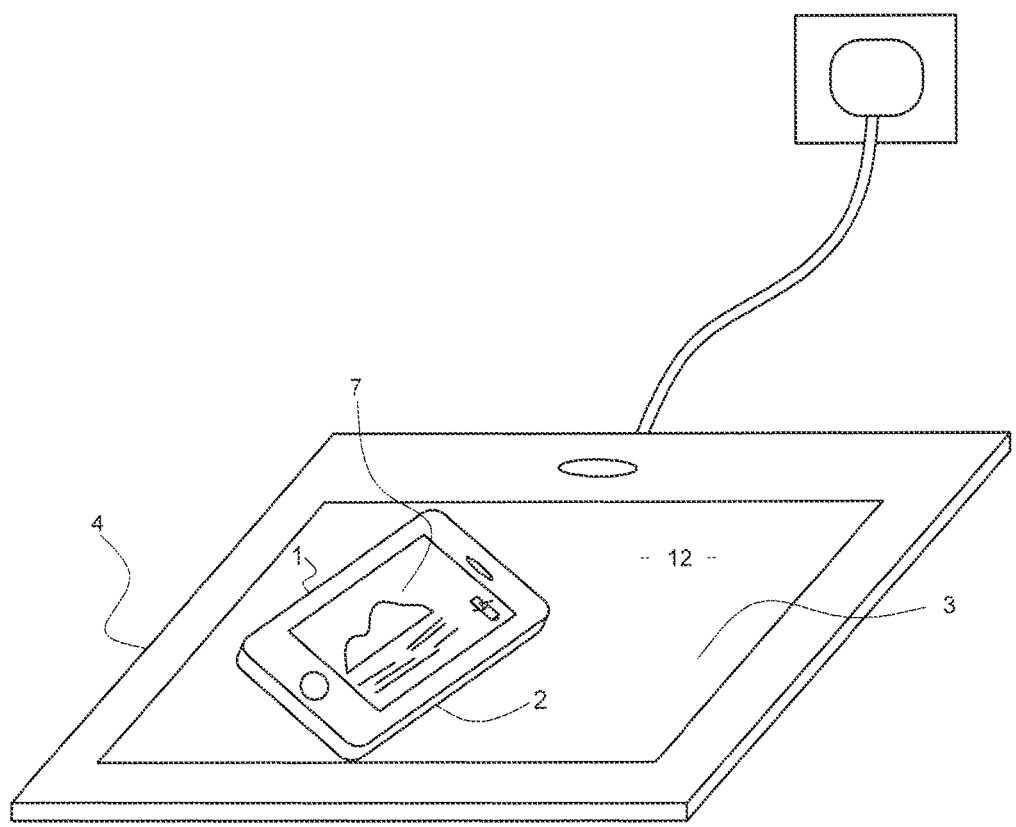
FIG. 5 is a perspective view of the transmitter apparatus of FIG. 2 shown with a mobile device in accordance with an embodiment of the present invention.

As a specific example, and referring particularly to FIG. 5, when the mobile device 1 is placed on the transmitter apparatus 4, wireless power transfer starts. At the same time, a "photo slide show" application, as an example of a target application 7, is initiated automatically. The user can then enjoy the show without the inconvenience of having to undertake any actions such as pushing any buttons, selecting the application, and selecting the required or desired operating mode.

Referring back to the initiator feature 5 described above, further details of three specific examples of embodiments will now be described.

Example 1

Figure 6C:
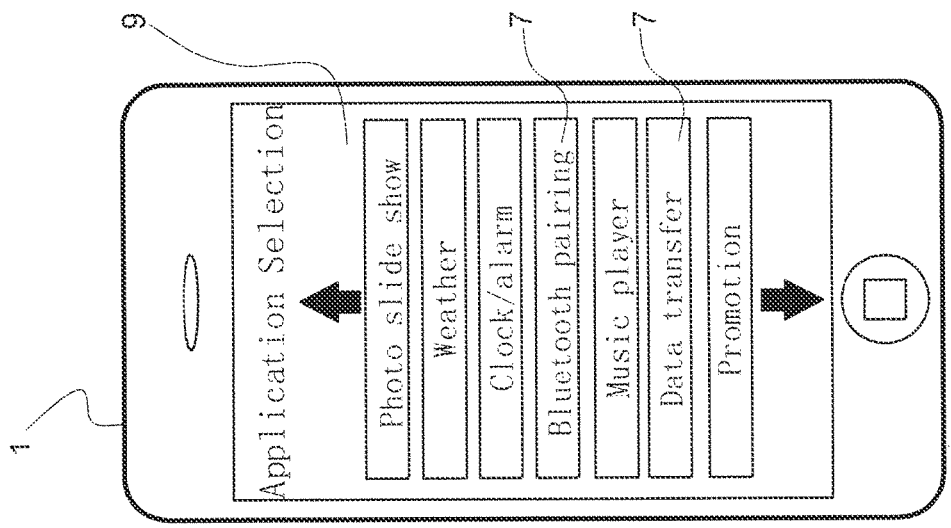
FIGS. 6(*a*) to 6(*c*) are front views of a mobile device showing screens for setting an automatically initiated application in accordance with an embodiment of the present invention.
Figure 6B:
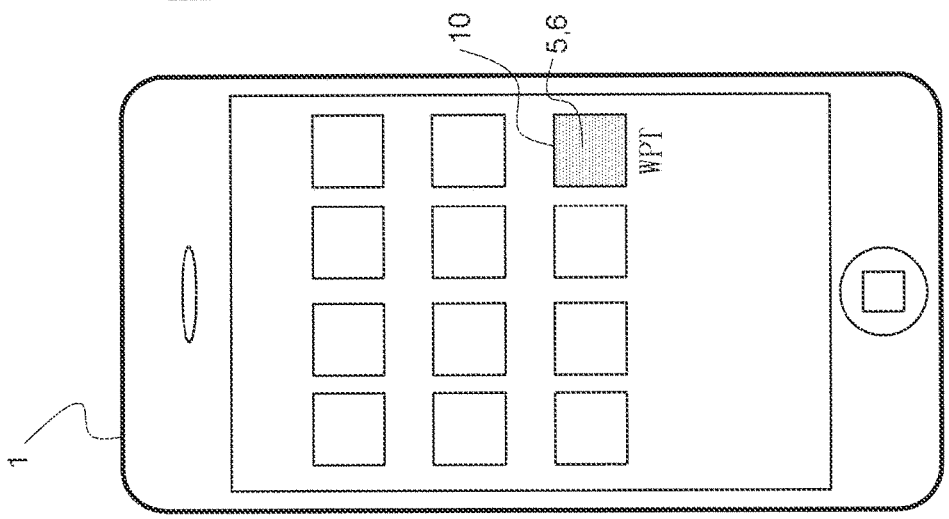
Figure 6A:
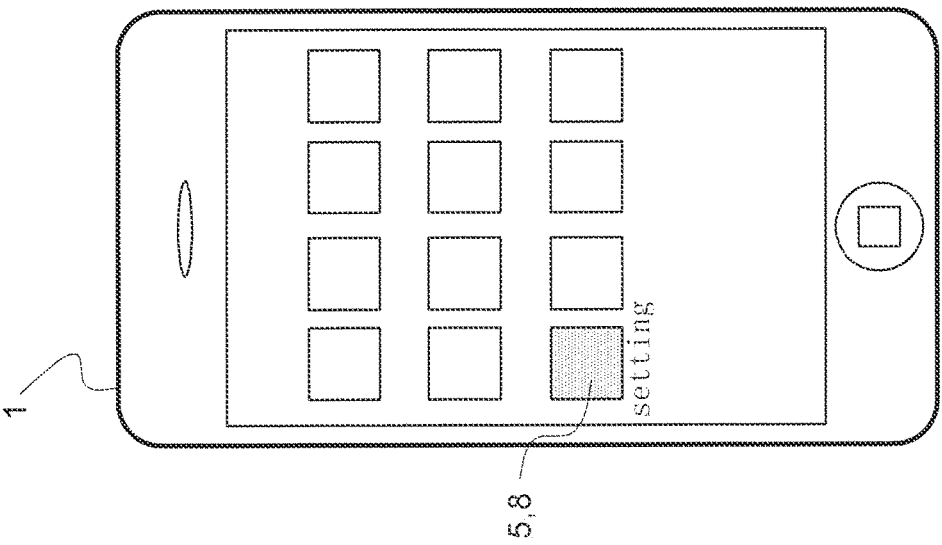

The initiator feature 5 is an integral feature of the mobile device 1. Once the power receiver 2 is coupled to the power transmitter 3, this feature starts automatically, and the device calls, initiates and prompts a function of the mobile device 1. The prompted function can be an internal function of the mobile device 1, or a target application 7, including in the form of a software application, which can run on the mobile device 1. The prompted function or target application can be a default selection on the mobile device 1, the most frequently used target application, of one pre-selected by a user in advance. For the latter option, that is, a function or target application pre-selected by the user, pre-selection can be done via a "setting" feature 8 on the mobile device 1, as shown in FIG. 6(a), which can be part of the initiator feature 5. As shown in FIG. 6(c), the "setting" feature 8 can include a menu 9 or a sub-menu that lists available functions or target applications 7 for selection, and from the menu 9 or the sub-menu, the user can simply choose the desired function or target application to be initiated when the power receiver 2 couples with the power transmitter 3. The functions or target applications that can be pre-selected can include all the functions and software applications of the mobile device 1 or only a sub-set of them. By pressing the up and down arrows shown in FIG. 6(c), more functions or target applications for selection can be viewed through scrolling up or down respectively.

Example 2

The initiator feature 5 includes an initiator application 6 in the form of a special software application. This special software application is indicated by an icon 10 in FIG. 6(b), which is labeled, for example, "WPT". Once the power receiver 2 is coupled to the power transmitter 3, the initiator application 6 runs automatically, and calls, initiates and prompts a function of the mobile device 1. The prompted function can be an internal function of the mobile device 1, or a target application 7, including in the form of a software application which can run on the mobile device 1. The prompted function or target application can be a default selection of the initiator software application "WPT" 6, the most frequently used target application, or one pre-selected by a user in advance. For the latter option, that is, a function or target application pre-selected by the user, the user simply selects via the initiator application "WPT" 6 the desired function or target application to be initiated when the power receiver 2 couples with the power transmitter 3, as shown in FIG. 6(c). In particular, the initiator application "WPT" 6 includes displaying the menu 9 or a sub-menu that lists the functions or target applications 7 that can be selected, and the user simply selects one of these functions or target applications from the menu 9 or the sub-menu. The functions or target applications that can be selected can include all the functions and software applications of the mobile device 1 or only a sub-set of them. This initiator software application "WPT" 6 can be further designed to only include some functions and applications to be selected in a free version, and to include all the functions and applications in a paid version.

Example 3

The function is implemented by an initiator application 6 itself. As above, the initiator application takes the form of a software application labeled "WPT". Once the power receiver 2 is coupled to the power transmitter 3, the initiator application "WPT" 6 runs automatically, and calls, initiates and prompts a function or target application which is a part of the initiator application "WPT" 6 itself. Referring to the example shown in FIG. 5, the "photo slide show" is a default or pre-selected function of the initiator application "WPT" 6. Of course, the user can select which function or target application to be initiated and prompted, as shown in FIG. 6(c). Similar to the previous approach, this initiator application can be further designed to only include some functions and target applications to be selected in the free version, and include all the functions and applications in the paid version. Moreover, more functions or target applications can be added with an update of the initiator application "WPT" 6.

With the latter two examples, in which an initiator application "WPT" is used, the initiator application "WPT" runs automatically upon the power receiver 2 coupling with the power transmitter 3. However, in some embodiments, the initiator application "WPT" runs in the background. This provides design freedom since in some mobile devices such an application can only work or works better if it is run in the background.

Further attention is now turned to the function that automatically initiates upon the power receiver 2 coupling with the power transmitter 3. As described above, at least part of the function can take the form of a target application 7, and in some embodiments, the whole function takes the form of a target application 7, that is, the target application 7 is the function. Therefore, any reference to the function in the present description can also refer to the target application, that is to say, the terms "function" and "target application" are interchangeable, unless otherwise specified.

In a preferred embodiment, the mobile device 1 includes one or more of the functions, with one of the functions pre-set on the mobile device, or set via a computer coupled with the mobile device, or set via the mobile device itself, to automatically initiate upon the power receiver 2 wirelessly coupling with the power transmitter 3.

In another preferred embodiment, the mobile device 1 also includes one or more of the functions. However, the power transmitter 3 has a mode, and one of the functions corresponds to the mode and automatically initiates upon the power receiver 2 wirelessly coupling with the power transmitter 3. The function that corresponds to the mode can be pre-set on the mobile device 1, or can be set via a computer coupled with the mobile device 1, or can be set via the mobile device 1 itself.

Preferably, the power transmitter 3 has a plurality of the modes, each corresponding to any one of the functions, with one of the modes being selectable such that the function corresponding to the selected mode automatically initiates upon the power receiver 2 wirelessly coupling with the power transmitter 3.

In one embodiment, the selected mode is selectable via the mobile device 1 whilst the power receiver 2 is coupled with the power transmitter 3. In another embodiment, the power transmitter 3 has one or more switches 11 corresponding to the modes and the selected mode is selectable by operating the one or more switches. In a further embodiment, the selected mode is selectable via a computer coupled with the power transmitter 3.

Thus, the power receiver 2 can couple with any one of one or more power transmitters 3, each corresponding to one of a plurality of different modes, and each mode corresponding to one of the functions, such that upon the power receiver wirelessly coupling with one of the power transmitters, the function that corresponds to the mode corresponding to said one of the power transmitters automatically initiates. Additionally, each power transmitter 3 can have a plurality of different modes available from which said one of the plurality of different modes can be selected.

In one embodiment, the function is dependent upon the location of the mobile device 1 or the power transmitter 3. In another embodiment, the function is additionally or separately dependent upon the orientation of the mobile device 1. In a further embodiment, the mode, and thereby the corresponding function, corresponds to a location of the power transmitter.

Figure 7A:
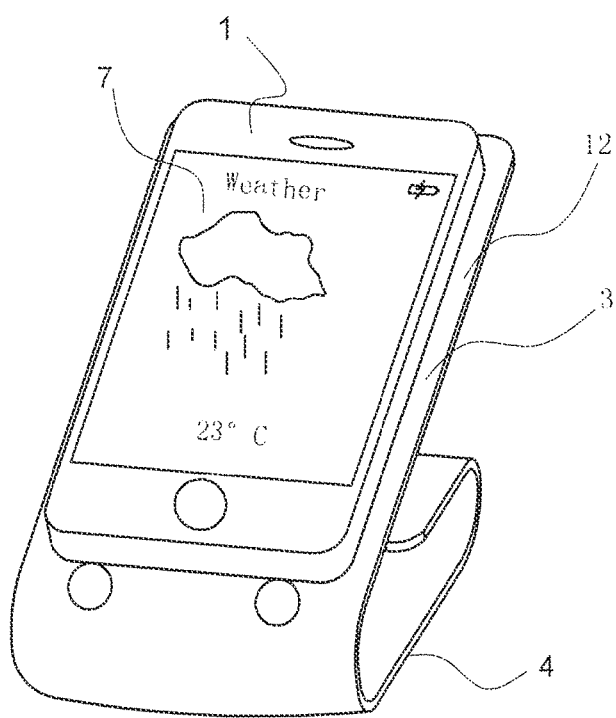
FIGS. 7(*a*) and 7(*b*) are perspective views of a mobile device coupled and a transmitter apparatus in accordance with embodiments of the present invention.
Figure 7B:
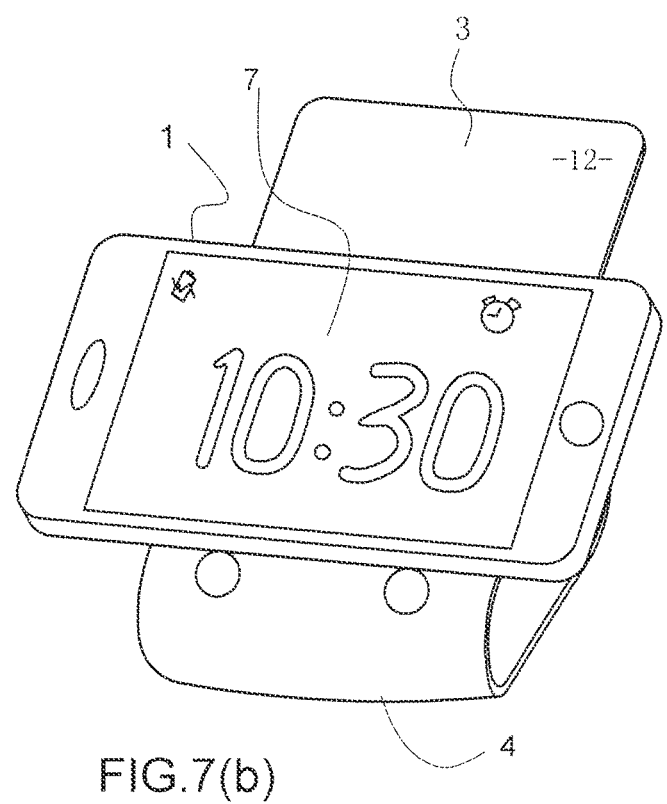

FIG. 7 shows an embodiment of the transmitter apparatus 4 for use in a bedroom. The transmitter apparatus 4 includes a power transmitter 3 having a "bedroom mode", and in this way can be referred to as a "bedroom mode" power transmitter. As a comparison, the embodiment of the transmitter apparatus 4 shown in FIG. 5 includes a power transmitter 3 set in a "living room mode", and can be referred to as a "living room mode" power transmitter. When a mobile device 1 is placed on the "bedroom mode" power transmitter 3, wireless power transfer starts. At the same time, a target application 7, which can be different to the one initiated and prompted by the "living room mode" power transmitter 3, is initiated and prompted automatically. In the example shown in FIG. 7(*a*), a weather function or a weather software application is initiated and prompted automatically.

Unlike the embodiment shown in FIG. 5, the power transmitter 3 shown in FIG. 7 does not have a charging surface 12 that lies horizontally on the table, with the charging surface 12 being the surface on which the mobile device 1 can be placed in order for the power receiver 2 to couple with the power transmitter 3. Instead, the charging surface 12 of the power transmitter 3 of FIG. 7 is at an inclined angle with the table surface so that the mobile device 1 on the power transmitter 3 faces a user looking straight ahead. The advantage is that the user can easily watch a video or have a conference call or use other convenient applications.

With such a power transmitter 3, or similar embodiments having an inclined or vertical charging surface 12, the mobile device 1 can be placed in a "portrait" or a "landscape" orientation, as shown in FIG. 7(*a*) and FIG. 7(*b*) respectively. Accordingly, the mobile device 1 can be designed to initiate and prompt different target applications automatically when the device is placed in a "portrait" or a "landscape" orientation on the charging surface 12 of the power transmitter 3. As shown in FIG. 7(*b*), a clock and alarm application is displayed when the mobile device 1 is in a "landscape" orientation. It will be noted that the implementation of this orientation-dependent feature requires the use of some sort of sensor or sensors in the mobile device 1 such as, for example, one or more gravity sensors or accelerometers. It will also be appreciated that the orientations described above are not exclusive and other orientations can be utilized.

Figure 8:
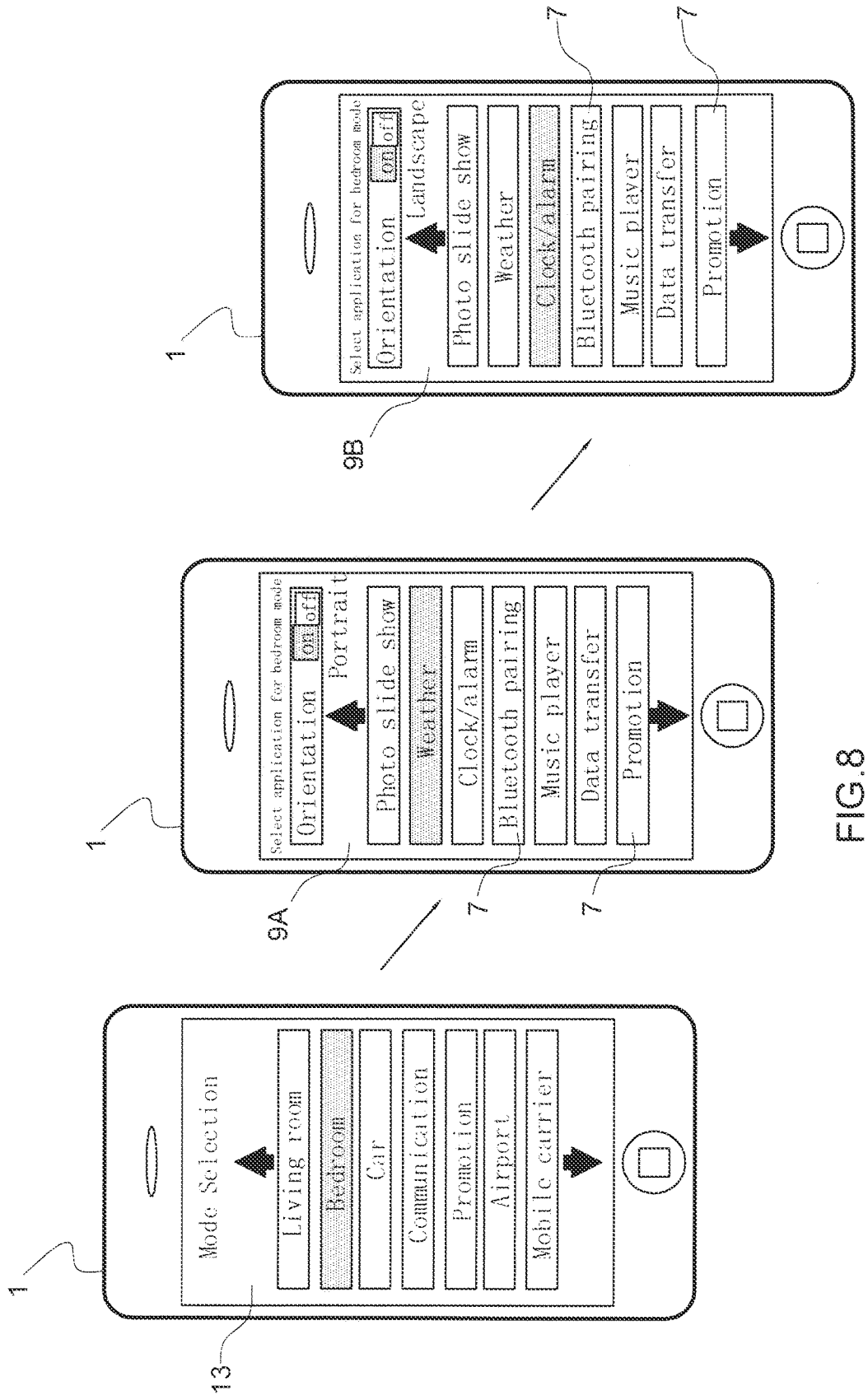
FIG. 8 shows front views of a mobile device showing screens for setting automatically initiated applications in accordance with an embodiment of the present invention.

To implement such so-called "different-mode-different-application" and "different-orientation-different-application" functionality, the "setting" feature 8 or the initiator application "WPT" 6 includes more selection options as shown in FIG. 8. Firstly, instead of the function or target application menu 9 described above, a "Mode Selection" menu 13 is displayed, from which a user can select different modes to set. After the mode is selected, another sub-menu 9A is displayed so that the user can select the function or target application to set for that mode. For each mode, the "orientation" feature can be switched to on or "off". If it is "on", after making a selection for the "portrait" orientation, which in this case is the default orientation, another sub-menu 9B will be displayed for the user to select the function or target application for the "landscape" orientation.

In the example shown in FIG. 8, the user firstly selects to set a "bedroom mode". Then, a target application 7 in the form of a weather application is pre-selected for the "portrait" orientation and a target application in the form of a clock/alarm application is pre-selected for the "landscape" orientation.

Figure 4:
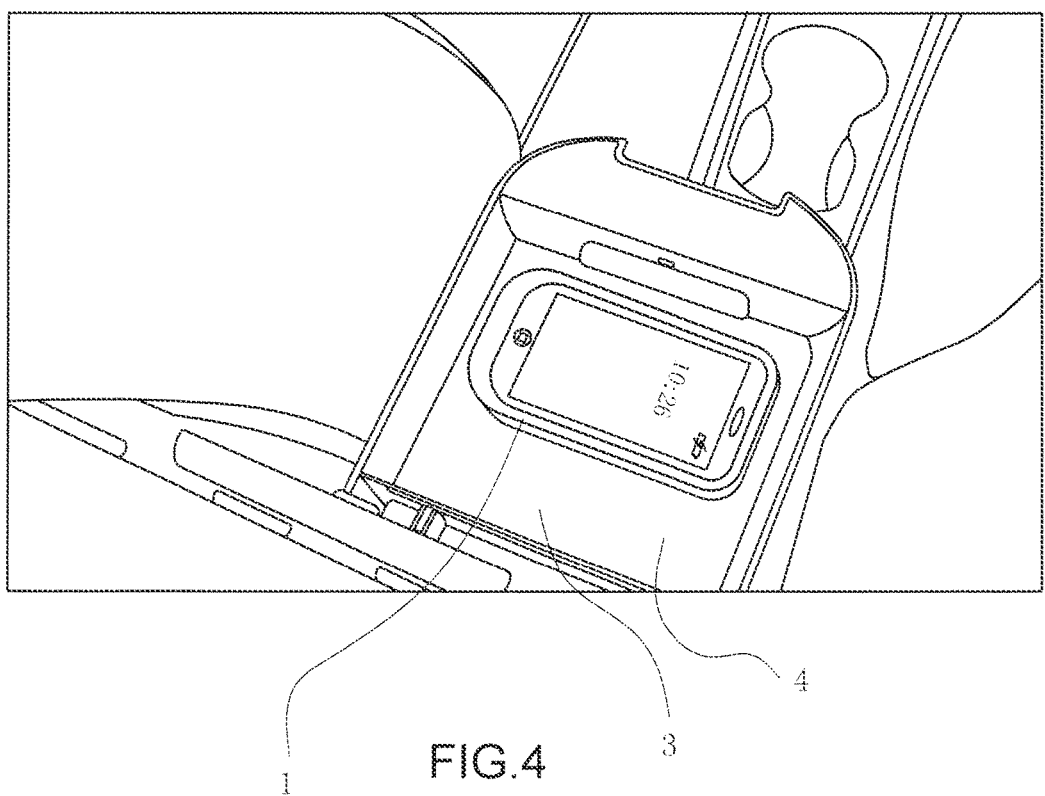
FIG. 4 is a perspective view of a transmitter apparatus in accordance with yet another embodiment of the present invention.

In another embodiment, the function includes data transfer between the mobile device and another device. In one example, the mobile device 1 is placed on a power transmitter 3 which is a part of the console of a car, as shown in FIG. 4. Such a power transmitter is of a different type from those shown in FIGS. 5 and 7, as it is set and sold with a "car mode". This power transmitter 3 will be referred to as a "car mode" power transmitter.

Figure 9:
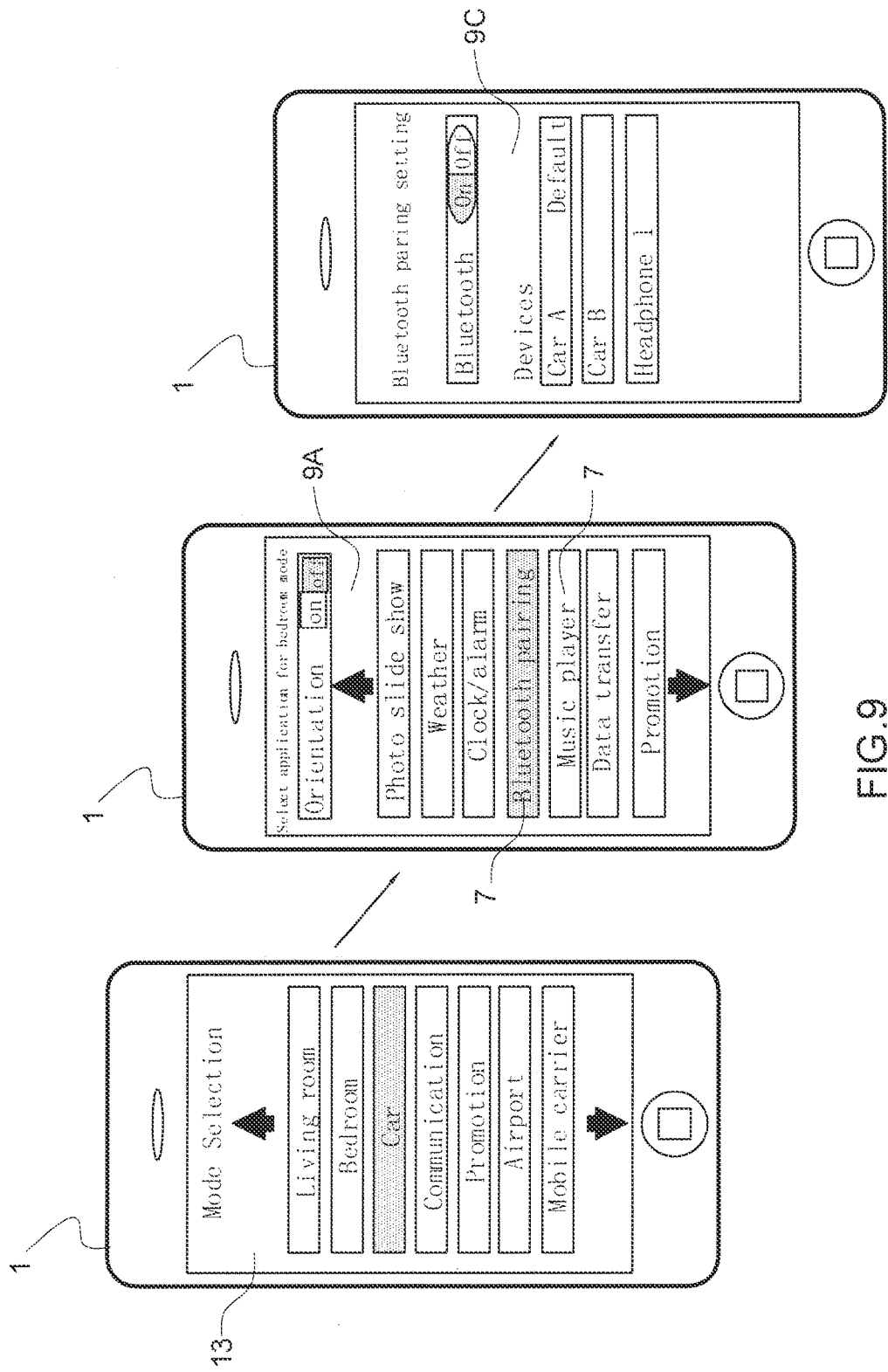
FIG. 9 shows front views of a mobile device showing screens for setting automatically initiated applications in accordance with another embodiment of the present invention.

When the mobile device 1 is placed on such a power transmitter 3, the wireless charging process starts. At the same time, the mobile device 1 recognizes the power transmitter 3 as a "car mode" power transmitter, and initiates a Bluetooth pairing function or target application automatically. In one embodiment, as shown in FIG. 9, the initiator feature 5 or initiator application 6 has the menu structure described above. The last menu is a sub-menu 9C of the first two menus that is displayed after a user has selected the mode and the target application. In the last menu, the user can configure settings for a specific target application, which in this case is a Bluetooth pairing application. In this way, the user can pre-select whether the Bluetooth module is turned on or off when the application is initiated. The user can also pre-select the default device for Bluetooth pairing.

As mentioned previously, the power transmitter mode can be pre-set and cannot be changed by a user. This is one option for the embodiments described above. However, power transmitters can have more than one mode, with the modes customizable in terms of the functions that correspond to the modes and which mode is the selected mode for a power transmitter. This will now be described in further detail with reference to the power transmitters 3 described above, as examples.

Figure 10:
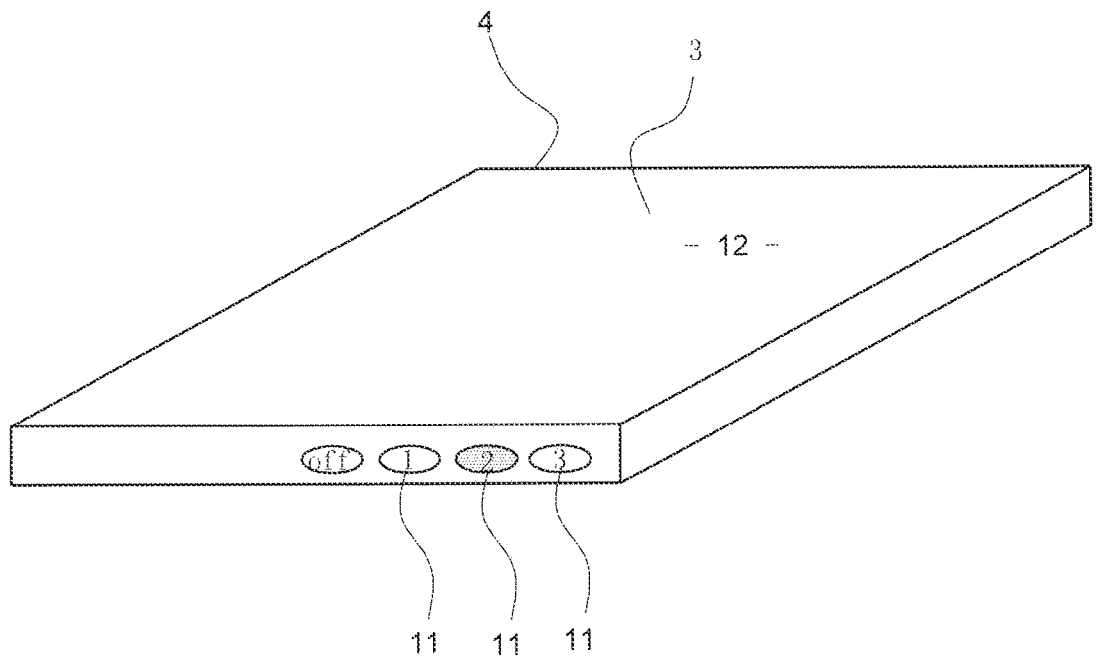
FIG. 10 is a perspective view of a transmitter apparatus showing switches corresponding to different modes in accordance with an embodiment of the present invention.

In one embodiment, the power transmitter 3 shown in FIG. 10 can have a switch to select a mode. In another embodiment, the mode can also be selected digitally by a controller of a large system if a power transmitter 3 is integrated into such a large system. In a further embodiment, the power transmitter mode can be changed by a command from a mobile device 1.

As a specific implementation example, reference is made to the power transmitter 3 described above that is a part of the console of a car. Switches 11 labeled "1", "2", and "3" are on the side of the power transmitter 3 and represent "car mode", "living room mode", and "bedroom mode", respectively. A user can switch the power transmitter 3 from "car mode" ("1") to "living room mode" ("2") by operating the respective switch or switches 11. On the mobile device 1, a target application 7 in the form of a "music player" application is pre-selected to match the "living room mode". Thus, when the user places the mobile device 1 on the power transmitter 3, wireless power transfer starts, and at the same time, the "music player" application instead of the "Bluetooth pairing" application will be initiated automatically.

In another embodiment, the transmitter apparatus 4 has a second power transmitter 14 that can couple with a second power receiver 15 in a second mobile device 16, and the function includes data transfer between the mobile device 1 and the second mobile device 16. In one embodiment, the second power receiver 15 couples with the second power transmitter 14 using a wired connection. In one embodiment, the mobile device 1 is a mobile phone and the second mobile device 16 is a portable computer. In this case, the data transfer between the mobile phone and the portable computer can be in the form of a "sync" operation to synchronize or backup data, such as applications, settings, and configurations, between the mobile phone and the portable computer.

The data transfer between the mobile device 1 and the second mobile device 16 can occur over a Personal Area Network (PAN), Local Area Network (LAN), or a Wide Area Network (WAN) using protocols such as IrDA, Bluetooth, Wi-Fi, and 3G. In one embodiment, the data transfer occurs between the power receivers 2 and 15 and the power transmitters 3 and 14 themselves. In particular, the power transmitter 3 transmits power wirelessly to the power receiver 2 thereby to define a first power transfer channel, and the second power transmitter 14 transmits power wirelessly to the second power receiver 15 thereby to define a second power transfer channel. The data transfer between the mobile device 1 and the second mobile device 16 includes transferring data between the mobile device 1 and the power transmitter 3 through the first power transfer channel, transferring data between the second mobile device 16 and the second power transmitter 14 through the second power transfer channel, and transferring data between the first and second power transmitters 3 and 14 respectively.

In one embodiment, each power receiver 2 and 15 receives power wirelessly from the respective power transmitter 3 and 14 in the form of a power signal in the respective power transfer channel. The data being transferred is encoded onto the power signal, which preferably includes modulating the power signal. A specific example of how this can be done is described later.

Further details of one specific embodiment of the transmitter apparatus 4 having a second power transmitter 14 that can couple with a second power receiver 15 in a second mobile device 16, so that data transfer con occur between the mobile device 1 and the second mobile device 16, will now be described. The power transmitters 3 and 14 of the power apparatus 4, which can be called a "double device transmitter apparatus", have a "communication mode". When a mobile device 1 is placed on the power transmitter 3, which has been set in the "communication mode", wireless power transfer starts. At the same time, a "data transfer" application which is set as a default or a pre-selected target application on the mobile device 1 to match the "communication mode" is initiated and prepared by the mobile device 1 automatically in order to ready the mobile device 1 for data transfer.

Figure 11:
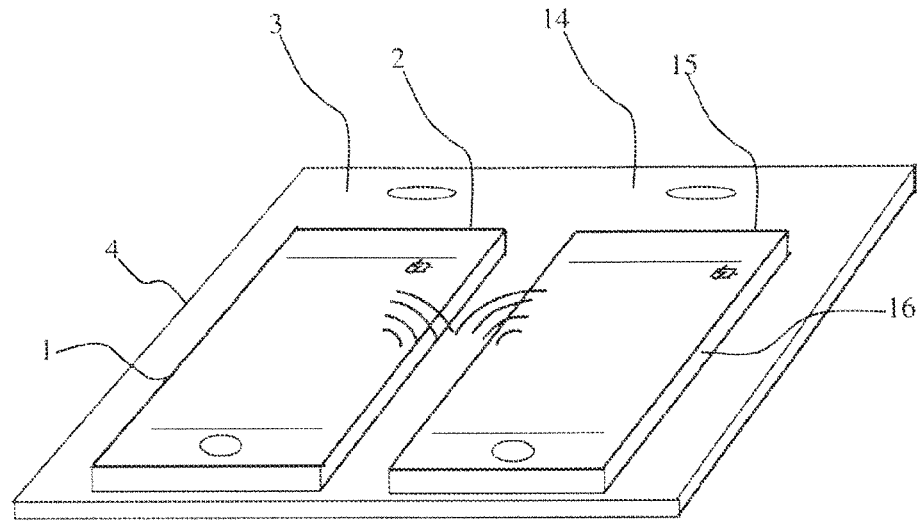
FIG. 11 is a perspective view of a transmitter apparatus and two mobile devices communicating with each other in accordance with an embodiment of the present invention.

When a second mobile device 16 is placed on the second power transmitter 14 of the transmitter apparatus 4, wireless power transfer starts and the same or similar "data transfer" application is initiated and prepared as a target application 7 on the second mobile device 16. The two mobile devices 1 and 16 can then communicate with each other for data transfer and information exchange, as shown in FIG. 11. As mentioned above, the communication can occur through a Personal Area Network (PAN), a Local Area Network (LAN), a Wide Area Network (WAN), or through the power receivers 2 and 15 and the power transmitters 3 and 14 themselves. One advantage of this approach is that the communication can be, and can only be, initiated and authorized when the two mobile devices 1 and 16 are placed on the same transmitter apparatus 4. This significantly enhances privacy and security. The privacy and security level can be further enhanced if the mobile devices 1 and 16 are designed to maintain such data transfer only when the mobile devices arc coupled with the power transmitters 3 and 14. Once either mobile device 1 or 16 is decoupled from the respective power transmitters 3 and 14, data transfer stops. With this approach, the transmitter apparatus 4 works like a data transfer hub.

Another embodiment involves communication between a mobile device 1 and another device in the form of a personal computer. In this embodiment, the power transmitter 3 has a "computer communication mode". The power transmitter 3 can be placed close to the personal computer. When the mobile device 1 is placed on the power transmitter 3, wireless power transfer starts. At the same time, a "sync" application which is a default or pre-selected target application set to correspond to the "computer communication mode" is initiated and prepared by the mobile device 1 automatically in order to ready the mobile device 1 for information exchange with the computer. Once an appropriate software application is started on the computer by the user, data transfer can take place between the mobile device 1 and the computer through a PAN or another type of network.

In another embodiment, the power transmitter 3 has a wired connection with the computer. When the above "sync" function or target application is initiated, the power transmitter 3 can also initiate an appropriate software application to run on the computer, so that the data transfer between the mobile device 1 and the computer can start automatically. In a further embodiment, the power transmitter 3 is an integral part of the computer. For example, it is a part of the top of the chassis of the computer, or a part of a surface of a laptop. With this embodiment, the power transmitter 3 can initiate the appropriate software application to run on the computer conveniently and easily.

In all the above communication embodiments, the mobile device 1 or the "sync" target application can also be designed to maintain the data transfer with the computer only when the mobile device 1 is coupled with the power transmitter 3. This can be done easily as a controller 17 in the power receiver 2, as shown in FIG. 1 can sense whether or not the power receiver 2 is receiving a power signal from the power transmitter 3.

There is also a simpler embodiment of the "double device transmitter apparatus" described above, in which the transmitter apparatus 4 has two power transmitters 3 and 14 side-by-side, each for receiving a respective mobile device 1 and 16, and allowing the transmitter apparatus 4 to charge the mobile devices simultaneously. When the mobile devices 1 and 16 are placed on the respective power transmitter 3 and 14, wireless power transfer starts. At the same time, a target application is initiated and prompted on each mobile device 1 and 16. The target application running on each device can be different, as the mode of the power transmitter 3 on one side of the transmitter apparatus 4, and the power transmitter 14 on the other side of the transmitter apparatus 4 can be set differently, and/or the pre-selected target application on each mobile device can be different.

In other embodiments, the transmitter apparatus 4 includes a plurality of the power transmitters 3 such that the transmitter apparatus can provide power wirelessly to a plurality of the mobile devices 1 simultaneously.

It will be appreciated that the above functions and target applications are more suited for private usage, although not exclusively. However, there are also many possible implementations in which power transmitters 3 or transmitter apparatuses 4 are installed for public use. For example, power transmitters 3 or transmitter apparatuses 4 can be implemented in a wide variety of public areas and situations, such as in a restaurant, in an airport or in a shop. The power transmitters in such areas can have a "public mode". When a mobile device 1 is placed on the power transmitter 3, wireless power transfer starts. At the same time, a "public" target application on the mobile device 1 is initiated and prompted automatically to match the "public mode".

In one such embodiment, the function or target application 7 includes requesting payment details from a user of the mobile device 1 before receiving power wirelessly from the power transmitter 3. For example, the user may be asked to pay for the charging process with the input of credit card information. In another embodiment, the function or target application 7 includes triggering an alarm if the mobile device 1 is decoupled, as a result of the mobile device being moved for example, from the power transmitter 3 before a user inputs a predetermined password. The function or target application 7 can include requesting the user to input a password to protect the mobile device 1 beforehand. The alarm can be audible and/or visual, such as a flashing screen or indicator light.

In another embodiment, the function or target application includes providing promotional information of a target business to a user of the mobile device 1. The promotional information can include an offer from the target business redeemable by the user. The power transmitter 3 can be associated with a source business and a reward can be provided to the source business when the offer is redeemed.

If the mobile device 1 includes a positioning module to determine the location of the mobile device, the function or target application 7 can provide promotional information of a product provided by the target business, whereby the product can be delivered within a predetermined proximity to the location of the mobile device 1. The positioning module can take the form of a GPS receiver incorporated into the mobile device 1.

One specific example is where a power transmitter 3 is integrated into a table in a restaurant, with the power transmitter being in a "promotion mode". When a mobile device 1 is placed on the power transmitter 3, wireless power transfer starts. At the same time, a "promotion" target application on the mobile device 1 is initiated and prompted automatically to match the "promotion mode". The location of the user can be determined through a Global Position System (GPS) function on the mobile device 1. As an alternative method, location information can be stored on the power transmitter 3, and transferred to the mobile device 1 with the communication method described earlier in this description and later in further detail. Once the location is determined, the promotion information or advertisement of a partner shop close to the restaurant, such as a bar or a cinema, can be pushed to the mobile device 1 through a WAN connection. The user can be, for example, presented with a discount code by the restaurant after reading such promotion information. The restaurant can also be rewarded in the form of profit share with its partner shops.

As the mobile device 1 can be coupled to the power transmitter 3 during the course of a dinner at the restaurant, more than one promotion or advertisement can be pushed to the mobile device 1 periodically. If the user does not choose to switch off the target application, the user can earn more rewards to redeem more discounts.

In another example, the mobile device 1 may not have a GPS and/or WAN connection. In these cases, the "promotion" target application can establish communication with a LAN, such as a Wi-Fi network provided by the restaurant. The promotion information or advertisement can then be pushed to the mobile device 1 through this network.

In a further embodiment, the function or target application 7 includes providing a sample or a preview of a product. In one variation, the sample or the preview is only provided whilst the power receiver is coupled with the power transmitter. In one embodiment, the function or target application 7 includes requesting payment and providing the product after accepting payment for the product. In a further variation, the function or target application 7 requests payment after the power receiver decouples from the power transmitter. The product can be, for example, a book, movie, video game, or a service accessible by the mobile device 1.

In one example, a power transmitter 3 is integrated into a table at an airport, and is configured in an "airport mode". When a mobile device 1 is placed on the power transmitter 3, wireless power transfer starts. At the same time, a target application 7 in the form of a "travel entertainment" application on the mobile device 1 is initiated and prompted automatically to match the "airport mode". The "travel entertainment" application establishes communication with a LAN, such as a Wi-Fi network of the airport, and starts to stream book pages or a movie onto the mobile device 1. The user can then read the book page-by-page or watch the video, but preferably only when the power receiver 2 of the mobile device 1 is coupled with the power transmitter 3. Once the user needs to leave when, for example, to board the plane for take-off, the user can select to pay in order to download the entire book or movie, and to resume reading or watching on the plane.

In another example, a power transmitter 3 is integrated into a charging station provided by a mobile telecommunications carrier, with the power transmitter operating in a "mobile telecom carrier mode". When a mobile device 1 is placed on the power transmitter 3, wireless power transfer starts. At the same time, a target application 7 in the form of a "carrier experience" application on the mobile device 1 is initiated and prompted to correspond to the "mobile telecom carrier mode". The "carrier experience" application unlocks a leading-edge communication or high-speed data transfer technology provided by the mobile telecommunications carrier in order to allow the user to experience the provided technology. The "carrier experience" application can be further designed to maintain such carrier experience only when the power receiver 2 of the mobile device 1 is coupled with the power transmitter 3. Once wireless power transfer is over or the mobile device 1 decoupled from the power transmitter 3, the carrier experience ends.

According to the above embodiments, different power transmitters 3 can have different modes, and different mobile devices 1 can initiate, prompt and/or maintain a function or a target application after the power transmitter mode is recognized. It will be appreciated that there can be many more modes than those described above. New power transmitter modes can be accepted by the mobile device 1, via for example the "WPT" initiator application 6 described previously. Once a new mode is accepted and implemented into a power transmitter 3, the initiator feature 5, or the firmware of the mobile device 1, or the initiator application 6 can be updated. Thus, the present invention provides a scalable approach. The following section describes features of the embodiments that implement recognition of power transmitter modes.

In one embodiment, which was briefly mentioned above, the power receiver 2 receives power wirelessly from the power transmitter 3 thereby to define a power transfer channel. Data is transferable through this power transfer channel between the power receiver 2 and the power transmitter 3. Thus, data is transferable between the mobile device 1 and the transmitter apparatus 4. Preferably, the power receiver 2 receives power wirelessly from the power transmitter 3 in the form of a power signal in the power transfer channel. Data is encoded onto the power signal, which preferably includes modulating the power signal.

As well as a mode, the power transmitter 3 can have one or more of an ID and location information and the data that can be transferred includes one or more of the mode, the ID, and the location information.

As mentioned above, data can also be transferred between the mobile device 1 and a second mobile device 16 having a second power receiver 15 for coupling with a second power transmitter 14, which with the power transmitter 3, is part of a transmitter apparatus 4. In particular, the power transmitter 3 transmits power wirelessly to the power receiver 2 thereby to define a first power transfer channel, and the second power transmitter 14 transmits power wirelessly to the second power receiver 15 thereby to define a second power transfer channel. The data transfer between the mobile device 1 and the second mobile device 16 includes transferring data between the mobile device 1 and the power transmitter 3 through the first power transfer channel, transferring data between the second mobile device 16 and the second power transmitter 14 through the second power transfer channel, and transferring data between the first and second power transmitters 3 and 14 respectively.

Figure 12:
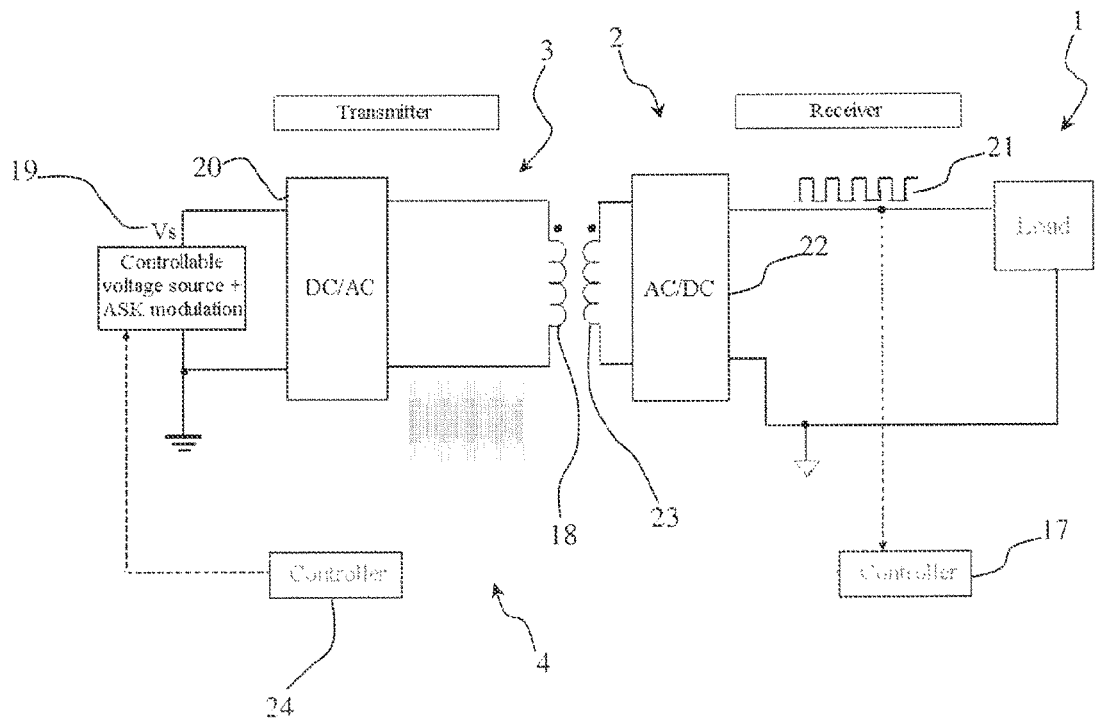
FIG. 12 is a schematic diagram of a power transmitter of a transmitter apparatus and a power receiver of a mobile device in accordance with embodiments of the present invention.

One embodiment of a communication method for transferring data between a power receiver 2 and a power transmitter 3 can be found in U.S. Pat. No. 7,915,858, the entirety of which is herein incorporated by reference. In one example, before power transfer starts, the power transmitter 3 can vary its input power into a transmitter winding 18 to generate a modulated signal. In the example shown in FIG. 12, this is done by varying the input voltage 19 to the DC/AC inverter 20. This can also be done with other power control methods.

Such a modulated signal can be, for example, encoded to represent the mode of the power transmitter 3. In the power receiver 2, a power receiver controller 17 can sense the output voltage 21 of the AC/DC converter 22. The variation of the output voltage 21 can then be decoded and read by the controller 17. In one embodiment, the received coded data is sent from the receiver controller 17 to the CPU of the mobile device 1 for power transmitter mode recognition. In another embodiment, the power receiver controller 17 is integrated with the CPU of the mobile device 1. In this case, the coded data can be read by the mobile device 1 directly.

It will be appreciated that the above communication method can also be used to transfer a wide variety of information other than the power transmitter mode. For example, each power transmitter 3 can have a unique ID or location information. It must be noted that other communication methods are not excluded and can be implemented to facilitate power transmitter mode recognition or other data transfer.

In more simple embodiments, such as those shown in FIGS. 5 and 6, the power transmitters 3 do not have different modes. There is no need for information transfer from the power transmitter 3 to the power receiver 2 to recognize the mode of the power transmitter 3. A power receiver controller 17, as shown in FIG. 1, can sense the magnetic field generated by a power transmitter 3, or the received wireless power, or other related characteristic. Once a power transmitter 3 is sensed, the power receiver controller 17 can inform the CPU of the mobile device 1 to initiate, prompt and/or maintain a default or a pre-selected target application. In another embodiment, the power receiver controller 17 is integrated with the CPU of the mobile device 1. In this case, the power transmitter 3 can be sensed by the mobile device 1 directly.

FIG. 1 shows a representative block diagram of a wireless charging system. It normally includes a "power transmitter", also known as an "energy transmitter", and a "power receiver", also known as an "energy receiver". An embodiment of the "power transmitter" is the power transmitter 3 described above, and an embodiment of the "power receiver" is the power receiver 2 described above. The power transmitter and power receiver are coupled with each other through magnetic induction, magnetic resonance or any other form of coupling enabling wireless power transfer between the transmitter and the receiver.

In the embodiments described above, the power receiver 2 couples with the power transmitter 3 using magnetic induction. Preferably, the power receiver 2 includes a planar receiver winding 23 for coupling by magnetic induction with the power transmitter 3. Also, the power transmitter 3 preferably includes one or more planar transmitter windings 18, each for coupling by magnetic induction with the power receiver 2. Advantageously, the one or more transmitter windings 18 are located in a surface of the power transmitter 3 to define a charging surface 12, as previously described, onto which the mobile device 1 can be placed.

Although the embodiments above are based on magnetic induction, it will be appreciated that the embodiments and the various features described are applicable to any other wireless power transfer methods.

Looking at a specific magnetic induction embodiment in further detail, the power transmitter 3 converts its input from a power source, which can be a DC power supply or an AC mains supply, into a medium frequency (normally above 100 kHz) power signal, which generates corresponding current flow in a transmitter winding 18. More specifically, the transmitter winding 18 is a planar winding or a winding array structure as described in U.S. Pat. No. 7,164,255, the entirety of which is herein incorporated by reference. The transmitter winding or winding array generates vertical magnetic flux like a "fountain" when current flows through it. If it is a winding array structure, the magnetic flux can have a uniform distribution over the whole charging surface 12 so that the power receiver 2 can be placed anywhere in the charging area defined by the charging surface 12 and receive charging.

When a power receiver 2 is placed in proximity to the magnetic flux generated from the power transmitter 3, the winding 23 in the power receiver 2 can effectively couple with the magnetic flux and convert it into the required power output. The power receiver 2 is then said to be "coupled with" a power transmitter. Such output can be used to directly charge a battery in the mobile device 1 or to operate as any other kind of power supply. The power receiver 2 may be a part of the mobile device 1, a part of a battery pack or an accessory, such as a sleeve, which has a power connection with the mobile device 1 in cases where the mobile device 1 itself does not have an integrated power receiver 2.

Also, as shown in FIG. 1, associated with both the power transmitter 3 and power receiver 2, there can be a respective controller 24 and 17 to control system operation. In FIG. 1, power flow is represented by the thick arrow, and data or information flow, as described previously, is represented by the thin arrows. As well as between the power transmitter 3 and the power receiver 2, data or information flow can also occur between the power transmitter controller 24 and the other parts of the power transmitter 3, and between the power receiver controller 17 and the other parts of the power receiver 2. As previously discussed, the transferred information can be simple information like identification, configuration and control signals for wireless charging purposes, or more complex information used for other applications such as those described in detail above.

Figure 2:
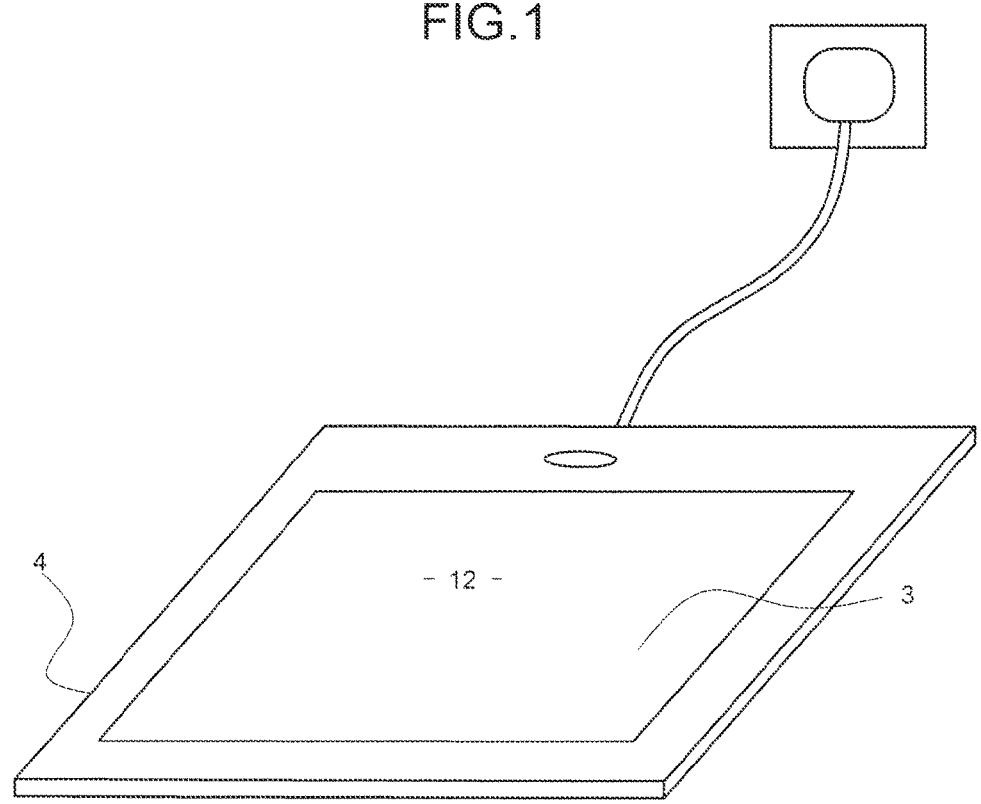
FIG. 2 is a perspective view of a transmitter apparatus in accordance with an embodiment of the present invention.
Figure 3:
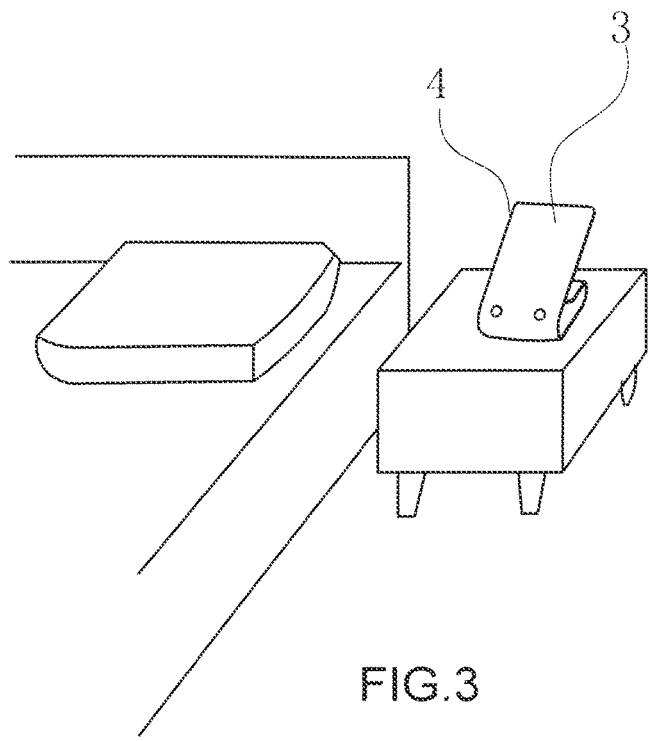
FIG. 3 is a perspective view of a transmitter apparatus in accordance with another embodiment of the present invention.

As mentioned previously, a power transmitter 3 may use a planar winding structure, which makes it easier to manufacture power transmitters with different form factors and/or to integrate power transmitters into different objects or devices. FIGS. 2 to 4 show some exemplary embodiments. FIG. 2 shows the basic embodiment of a transmitter apparatus 4 in the form of a planar wireless charging pad having one or more power transmitters 3 on which one or more than one mobile device with a power receiver can be placed and charged. In some embodiments, it is also possible for the power receiver 2 to be placed close to the pad without touching it. Such a pad can be placed or installed at home, in the office or be integrated into any surface. Although the charging pad in FIG. 2 is powered by AC mains, it can also be powered by any power source, such as, for example, a DC power supply in a car.

As described above, FIG. 3 is an embodiment of a transmitter apparatus 4 in the form of a bedside wireless charger. Compared to the one shown in FIG. 2, this charger does not have a horizontal charging surface 12. Instead, it has a charging surface 12 inclined towards a vertical angle with the desk surface. The details of this embodiment were described above. FIG. 4 shows a built-in power transmitter 3 in the console of a car.

It must be noted that due to the wide adoption of wireless charging standards, such as the one set up by the Wireless Power Consortium, a mobile device 1 housing a power receiver 2 compliant to a standard can be charged across different power transmitters 3, such as those shown in FIGS. 2 to 4. Such compatibility and interoperability significantly increase user convenience in mobile device usage. Users will be more inclined to constantly place their mobile devices 1 on a power transmitter 3. It is therefore desirable to include more features, such as those provided by the present invention and exemplified in the embodiments described above, to further enhance this convenience.

The present invention also provides, in a separate aspect, a computer-readable medium with an executable application program stored thereon, in which the executable application program is downloadable to a mobile device having a power receiver for wirelessly coupling with a power transmitter to receive power wirelessly from the power transmitter, such that the executable application program automatically initiates a function of the mobile device upon the power receiver wirelessly coupling with the power transmitter. Preferred embodiments of this aspect of the present invention will be clearly evident in view of the detailed description above. In particular, the executable application program is in the form of the initiator application 6 and is downloadable to the mobile device 1 having the power receiver 2 for wirelessly coupling with the power transmitter 3 to receive power wirelessly from the power transmitter. The executable application program in the form of the initiator application 6 automatically initiates a function of the mobile device 1 upon the power receiver wirelessly coupling with the power transmitter. Furthermore, the function can be the functions or the target applications 7 described in detail previously.

The present invention further provides, in another separate aspect, a computer-readable medium with an executable application program stored thereon, the executable application program downloadable to a mobile device having a power receiver for wirelessly coupling with a power transmitter to receive power wirelessly from the power transmitter, such that the executable application program forms at least part of a function that is automatically initiated upon the power receiver wirelessly coupling with the power transmitter. Again, preferred embodiments of this aspect of the present invention will be clearly evident in view of the detailed description above. In particular, the executable application program is in the form of the target application 7 and is downloadable to the mobile device 1 having the power receiver 2 for wirelessly coupling with the power transmitter 3 to receive power wirelessly from the power transmitter. The executable application program in the form of the target application 7 forms at least part of a function that is automatically initiated upon the power receiver 2 wirelessly coupling with the power transmitter 3. As noted previously, with each of the functions described in the detailed description above, at least part of the function can take the form of a target application 7, and in some embodiments, the whole function takes the form of a target application 7, that is, the target application 7 is the function. Therefore, any reference to the function in the present description can also refer to the target application, that is to say, the terms "function" and "target application" are interchangeable, unless otherwise specified.

The present invention also provides, in another separate aspect, a method of manufacturing or supplying a mobile device having a power receiver for wirelessly coupling with a power transmitter to receive power wirelessly from the power transmitter, the method including adding into the mobile device a function that automatically initiates upon the power receiver wirelessly coupling with the power transmitter. Again, preferred embodiments of this aspect of the present invention will be clearly evident in view of the detailed description above.

Furthermore, the present invention provides, in another separate aspect, a method of manufacturing or supplying a transmitter apparatus having a power transmitter for wirelessly coupling with a power receiver in a mobile device to provide power wirelessly to the power receiver, the method including configuring the transmitter apparatus such that upon the power receiver wirelessly coupling with the power transmitter, data is transferred between the power transmitter and the power receiver and a function of the mobile device automatically initiates. Yet again, preferred embodiments of this aspect of the present invention will be clearly evident in view of the detailed description above.

Although the invention has been described with reference to specific examples, it will be appreciated by those skilled in the art that the invention can be embodied in many other forms. It will also be appreciated by those skilled in the art that the features of the various examples described can be combined in other combinations.

The invention claimed is:

1. A mobile device including:
   a power receiver for wirelessly coupling with a power transmitter to receive power wirelessly from the power transmitter;
   a function that automatically initiates upon the power receiver wirelessly coupling with the power transmitter, the function further configured to cause the mobile device to provide promotional information of a product offered by a target business to a user; and
   a positioning module that obtains a position of the power transmitter, where the product is available within a predetermined physical proximity to a current location of the mobile device.

2. The mobile device of claim 1, wherein the function includes requesting payment details from a user of the mobile device before being allowed to receive power wirelessly from the power transmitter.

3. The mobile device of claim 1, wherein the function includes triggering an alarm if the mobile device is decoupled from the power transmitter before a user inputs a predetermined password.

4. The mobile device of claim 1, wherein the promotional information includes an offer from the target business redeemable by the user.

5. The mobile device of claim 1, wherein the power transmitter is associated with a source business different from target business, and a reward is provided to the source business when the offer is redeemed.

6. The mobile device of claim 1, wherein the function includes providing a sample or a preview of the product.

7. The mobile device of claim 6, wherein the sample or the preview is only provided whilst the power receiver is coupled with the power transmitter.

8. The mobile device of claim 1, wherein the function includes requesting payment and providing the product after accepting payment for the product.

9. The mobile device of claim 1, wherein the function requests payment after the power receiver decouples from the power transmitter.

10. The mobile device of claim 1, wherein the function is dependent upon the orientation of the mobile device with respect to the power transmitter.

11. The mobile device of claim 1, wherein the function includes data transfer between the mobile device and another device coupled to the power transmitter.

12. A mobile device including:
   a power receiver for wirelessly coupling with a power transmitter to receive power wirelessly from the power transmitter;
   a function that automatically initiates upon the power receiver wirelessly coupling with the power transmitter, the function further configured to cause the mobile device to provide promotional information of a product offered by a target business to a user, wherein the function requests payment after the power receiver decouples from the power transmitter.

13. The mobile device of claim 12, wherein the function includes requesting payment details from a user of the mobile device before being allowed to receive power wirelessly from the power transmitter.

14. The mobile device of claim 12, wherein the function includes triggering an alarm if the mobile device is decoupled from the power transmitter before a user inputs a predetermined password.

15. The mobile device of claim 12, wherein the promotional information includes an offer from the target business redeemable by the user.

16. The mobile device of claim 12, wherein the power transmitter is associated with a source business different from target business, and a reward is provided to the source business when the offer is redeemed.

17. The mobile device of claim 12, wherein the function includes providing a sample or a preview of the product.

18. The mobile device of claim 17, wherein the sample or the preview is only provided whilst the power receiver is coupled with the power transmitter.

19. The mobile device of claim 12, wherein the function includes requesting payment and providing the product after accepting payment for the product.

20. The mobile device of claim 12, wherein the function is dependent upon the orientation of the mobile device with respect to the power transmitter.

21. The mobile device of claim 12, wherein the function includes data transfer between the mobile device and another device coupled to the power transmitter.

22. A mobile device including:
   a power receiver for wirelessly coupling with a power transmitter to receive power wirelessly from the power transmitter;
   a function that automatically initiates upon the power receiver wirelessly coupling with the power transmitter, the function configured to request payment details from a user of the mobile device before receiving power wirelessly from the power transmitter, and wherein the function requests payment after the power receiver decouples from the power transmitter.

\* \* \* \* \*